United States Patent
Lee et al.

(10) Patent No.: US 10,162,615 B2
(45) Date of Patent: Dec. 25, 2018

(54) COMPILER

(71) Applicant: SAMSUNG ELECTRONICS CO., LTD., Suwon-si (KR)

(72) Inventors: In-Ho Lee, Hwaseong-si (KR); Wee-Young Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 194 days.

(21) Appl. No.: 14/965,954

(22) Filed: Dec. 11, 2015

(65) Prior Publication Data

US 2016/0170726 A1    Jun. 16, 2016

(30) Foreign Application Priority Data

Dec. 11, 2014  (KR) .................. 10-2014-0178081

(51) Int. Cl.
  *G06F 9/44*   (2018.01)
  *G06F 8/41*   (2018.01)

(52) U.S. Cl.
  CPC .................... *G06F 8/443* (2013.01)

(58) Field of Classification Search
  CPC ............ G06F 8/443; G06F 8/52; G06F 8/41
  USPC .......................................... 717/146
  See application file for complete search history.

(56) References Cited

U.S. PATENT DOCUMENTS

| 6,044,459 | A | 3/2000 | Bae et al. |
| 6,324,643 | B1 | 11/2001 | Krishnan et al. |
| 6,356,997 | B1 | 3/2002 | Krishnan et al. |
| 6,931,635 | B2 | 8/2005 | Inagaki et al. |
| 7,143,402 | B2 | 11/2006 | Ogasawara et al. |
| 7,528,843 | B1* | 5/2009 | Kilgard ............. G06T 15/005 345/421 |
| 8,065,502 | B2 | 11/2011 | Gonion |
| 8,291,398 | B2 | 10/2012 | Kawahito et al. |
| 8,387,022 | B2 | 2/2013 | Horning et al. |
| 2003/0198295 | A1 | 10/2003 | Chen et al. |
| 2003/0225998 | A1 | 12/2003 | Khan et al. |
| 2004/0237074 | A1* | 11/2004 | Aronson ............. G06F 8/4434 717/158 |
| 2007/0169027 | A1* | 7/2007 | Drepper ............. G06F 8/75 717/140 |
| 2010/0169613 | A1 | 7/2010 | Torvalds et al. |
| 2010/0199269 | A1* | 8/2010 | Hattori ............. G06F 8/443 717/146 |
| 2014/0082338 | A1 | 3/2014 | Bonanno et al. |
| 2014/0164746 | A1 | 6/2014 | Greiner et al. |

(Continued)

FOREIGN PATENT DOCUMENTS

| KR | 0167307 B1 | 1/1999 |
| KR | 100240591 B1 | 3/2000 |
| KR | 20010050794 A | 6/2001 |

(Continued)

*Primary Examiner* — Li B. Zhen
*Assistant Examiner* — Hui-Wen Lin
(74) *Attorney, Agent, or Firm* — Sughrue Mion, PLLC

(57) ABSTRACT

A computer system for compiling a source code into an object code includes means for converting the source code into an intermediate code, means for generating a modified-intermediate code by replacing a first command that satisfies a condition, among commands included in the intermediate code, with a conditional branch command, and means for converting the modified-intermediate code into the object code.

14 Claims, 10 Drawing Sheets

(56) References Cited

U.S. PATENT DOCUMENTS

2014/0164747 A1  6/2014  Gschwind et al.

FOREIGN PATENT DOCUMENTS

| KR | 100576389 | B1 | 5/2006 |
| KR | 100655275 | B1 | 12/2006 |
| KR | 100718754 | B1 | 5/2007 |

* cited by examiner

FIG. 5A

```
vec4 d = evaluate_function();
vec4 color = step(b,c) * d;
```
~BCD(1)

or

```
float a = step(b,c);
vec4 d = evaluate_function();
color = a * d;
```
~BCD(2)

FIG. 5B

```
if(b <= c) {
    color = vec4(0.0);
else {
    vec4 d = evaluate_function();
    color = d;
}
```
~ACD(1)

FIG. 6A

```
vec4 d = evaluate_function();
vec4 color = max(b,0) * d;
```
~ BCD(3)

or

```
float a = max(b,0);
vec4 d = evaluate_function();
color = a * d;
```
~ BCD(4)

FIG. 6B

```
if(b <= 0) {
    color = vec4(0.0);
else {
    vec4 d = evaluate_function();
    color = b * d;
}
```
~ ACD(2)

COMPILER

CROSS-REFERENCE TO RELATED APPLICATION

This application claims priority from Korean Patent Application No. 10-2014-0178081, filed on Dec. 11, 2014, in the Korean Intellectual Property Office (KIPO), the disclosure of which is incorporated herein by reference in its entirety.

BACKGROUND

1. Field

Apparatuses and methods consistent with exemplary embodiments relate to a compiler.

2. Description of the Related Art

Generally, a compiler processes a source code (or, a source program) programmed by a specific programming language to convert the source code into a machine code or an object code (or, an object program) that can be used by a hardware. When the compiler interprets commands included in the source code, the compiler efficiently uses commands supported by the hardware (e.g., a central processing unit (CPU) of a computer, etc.). However, even when the compiler efficiently uses the commands supported by the hardware, the commands supported by the hardware or commands previously verified as efficient commands may be unnecessarily executed in a specific hardware.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a computer system for compiling a source code into an object code that can prevent an execution time from being unnecessarily increased (i.e., can prevent commands supported by a hardware or commands previously verified as efficient commands from being unnecessarily executed) when an object code generated from a source code is executed in a specific hardware.

Exemplary embodiments provide a computer implemented method for compiling a source code into an object code that can prevent an execution time from being unnecessarily increased (i.e., can prevent commands supported by a hardware or commands previously verified as efficient commands from being unnecessarily executed) when an object code generated from the source code is executed in a specific hardware.

According to an aspect of an exemplary embodiment, there is provided a computer system for compiling a source code into an object code. The computer system may include means for converting the source code into an intermediate code, means for generating a modified-intermediate code by replacing a first command that satisfies a condition, among commands included in the intermediate code, with a conditional branch command, and means for converting the modified-intermediate code into the object code.

The condition may include a condition in which a result of the first command is handled as a constant, a condition in which the result of the first command and a result of a second command among the commands are concurrently used in a third command among the commands, and a condition in which a result of the third command is determined by the constant regardless of the result of the second command.

The condition may further include a condition in which the result of the second command and an intermediate result of the second command are not used in commands other than the third command in the intermediate code.

The means for generating the modified-intermediate code may generate the modified-intermediate code by removing the second command from a first branch part of the conditional branch command or a second branch part of the conditional branch command as the means for generating the modified-intermediate code replaces the first command with the conditional branch command, the first branch part being opposite to the second branch part.

The means for converting the source code into the intermediate code may include means for generating tokens by performing a lexical analysis on the source code, means for generating a syntax structure by performing a syntax analysis and a parsing on the tokens, means for performing a semantic analysis on the syntax structure, and means for generating the intermediate code based on the semantic analysis.

The means for converting the modified-intermediate code into the object code may include means for generating an optimized modified-intermediate code by optimizing the modified-intermediate code, and means for generating the object code based on the optimized modified-intermediate code.

The means for generating the modified-intermediate code may be located outside the means for converting the source code into the intermediate code and the means for converting the modified-intermediate code into the object code. The means for generating the modified-intermediate code may be coupled between the means for generating the intermediate code in the means for converting the source code into the intermediate code and the means for generating the optimized modified-intermediate code included in the means for converting the modified-intermediate code into the object code.

The means for generating the modified-intermediate code may be located inside the means for converting the source code into the intermediate code. The means for generating the modified-intermediate code may be combined with the means for generating the intermediate code included in the means for converting the source code into the intermediate code.

The means for generating the modified-intermediate code may be located inside the means for converting the modified-intermediate code into the object code. The means for generating the modified-intermediate code may be combined with the means for generating the optimized modified-intermediate code included in the means for converting the modified-intermediate code into the object code.

According to an aspect of another exemplary embodiment, there is provided a computer system for compiling a source code into an object code. The computer system may include means for generating an intermediate code by replacing a first command that satisfies a condition, among commands included in the source code, with a conditional branch command, and means for converting the intermediate code into the object code.

The condition may include a condition in which a result of the first command is handled as a constant, a condition in which the result of the first command and a result of a second command among the commands are concurrently used in a third command among the commands, and a condition in which a result of the third command is determined by the constant regardless of the result of the second command.

The condition may further include a condition in which the result of the second command and an intermediate result of the second command are not used in commands other than the third command in the source code.

The means for generating the intermediate code may generate the intermediate code by removing the second command from a first branch part of the conditional branch command or a second branch part of the conditional branch command as the means for generating the intermediate code replaces the first command with the conditional branch command, the first branch part being opposite to the second branch part.

The means for generating the intermediate code may include means for generating tokens by performing a lexical analysis on the source code, means for generating a syntax structure by performing a syntax analysis and a parsing on the tokens, means for performing a semantic analysis on the syntax structure, and means for generating the intermediate code based on the semantic analysis and replacing the first command that satisfies the condition, among the commands included in the source code, with the conditional branch command.

The means for converting the intermediate code into the object code may include means for generating an optimized intermediate code by optimizing the intermediate code, and means for generating the object code based on the optimized intermediate code.

According to an aspect of another exemplary embodiment, there is provided a computer implemented method for compiling a source code into an object code, the computer implemented method including converting the source code into an intermediate code, and modifying the intermediate code by replacing a first command that satisfies a condition, among commands of the intermediate code, with a conditional branch command. The method further includes converting the modified intermediate code into the object code.

The computer implemented method may further include determining whether a first condition is satisfied, the first condition being a condition in which a result of the first command is handled as a constant, determining whether a second condition is satisfied, the second condition being a condition in which the result of the first command and a result of a second command among the commands are concurrently used in a third command among the commands, and determining whether a third condition is satisfied, the third condition being a condition in which a result of the third command is determined by the constant regardless of the result of the second command. The modifying may include modifying the intermediate code by replacing the first command with the conditional branch command in response to the determining that the first condition, the second condition, and the third condition are satisfied.

The computer implemented method may further include determining whether a fourth condition is satisfied, the fourth condition being a condition in which the result of the second command and an intermediate result of the second command are not used in commands other than the third command in the intermediate code. The modifying may include modifying the intermediate code by replacing the first command with the conditional branch command in response to the determining that the first condition, the second condition, the third condition, and the fourth condition are satisfied.

The modifying may include modifying the intermediate code by removing the second command from a first branch part of the conditional branch command or a second branch part of the conditional branch command in response to the replacing the first command with the conditional branch command, the first branch part being opposite to the second branch part.

A non-transitory computer-readable storage medium may store a program including instructions to cause a computer to perform the computer implemented method.

BRIEF DESCRIPTION OF THE DRAWINGS

The above and/or other aspects will be more apparent by describing certain exemplary embodiments with reference to the accompanying drawings.

FIGS. 5A and 5B are diagrams illustrating an example in which an intermediate code is modified into a modified-intermediate code by the compiler of FIG. 1.

FIGS. 6A and 6B are diagrams illustrating another example in which an intermediate code is modified into a modified-intermediate code by the compiler of FIG. 1.

DETAILED DESCRIPTION OF THE EXEMPLARY EMBODIMENTS

Figure 1:
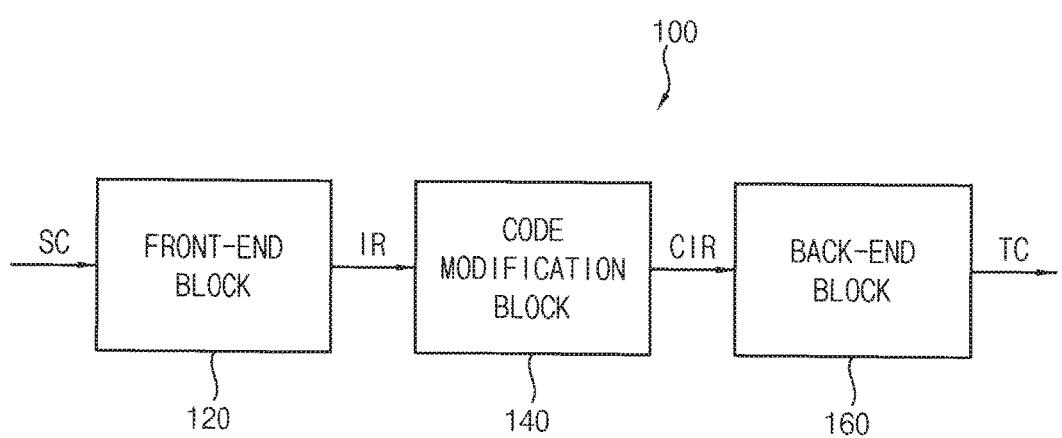
FIG. 1 is a block diagram illustrating a compiler according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing the exemplary embodiments and is not intended to be limiting of the present inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the terms such as "unit", "-er (-or)", "module", "block" and "device" described in the specification refer to an element for performing at least one function or operation, and may be implemented in hardware, software, or the combination of hardware and software.

Figure 2:
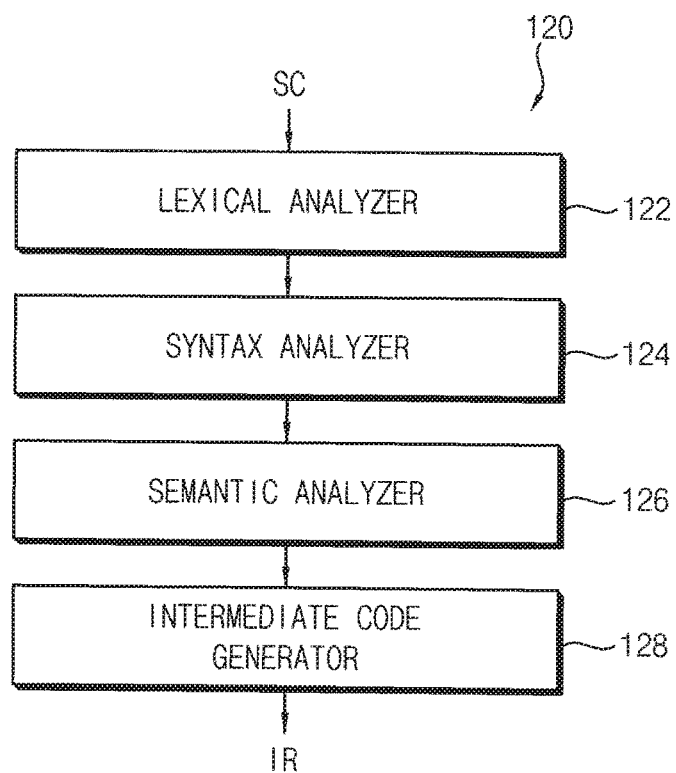
FIG. 2 is a block diagram illustrating an example of a front-end block included in the compiler of FIG. 1.
Figure 3:
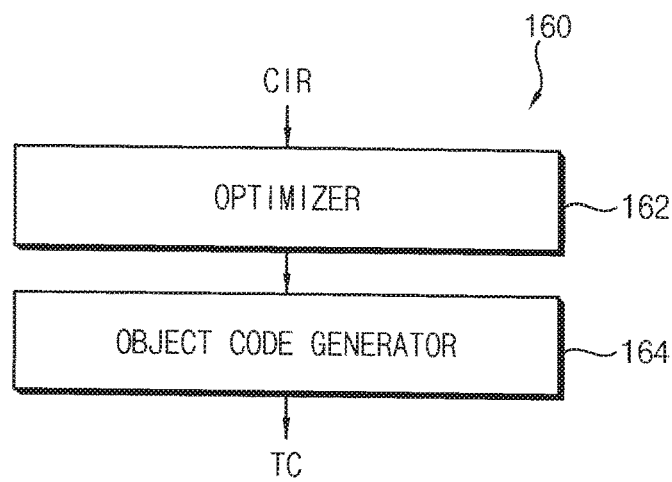
FIG. 3 is a block diagram illustrating an example of a back-end block included in the compiler of FIG. 1.

FIG. 1 is a block diagram illustrating a compiler 100 according to an exemplary embodiment. FIG. 2 is a block diagram illustrating an example of a front-end block 120 included in the compiler 100 of FIG. 1. FIG. 3 is a block diagram illustrating an example of a back-end block 160 included in the compiler 100 of FIG. 1.

Referring to FIGS. 1 through 3, the compiler 100 converts a source code SC (or, a source program) into an object code TC (or, an object program). For this operation, the compiler 100 includes the front-end block 120, a code modification block 140, and the back-end block 160. Although it is illustrated in FIG. 1 that the code modification block 140 is located outside the front-end block 120 and the back-end block 160, the code modification block 140 may be located inside the front-end block 120 or inside the back-end block 160.

The front-end block 120 converts the source code SC into an intermediate code IR. Here, the intermediate code IR may be an internal code for converting the source code SC into the object code TC. In an example, a format of the intermediate code IR may be the same as a format of the source code SC. In another example, the format of the intermediate code IR may be different from the format of the source code SC. The front-end block 120 may receive the source code SC that is programmed by a specific programming language, and generates the intermediate code IR, which is to be converted into the object code TC, based on the source code SC.

For this operation, as illustrated in FIG. 2, the front-end block 120 includes a lexical analyzer 122, a syntax analyzer 124, a semantic analyzer 126, and an intermediate code generator 128. The lexical analyzer 122 receives the source code SC from the outside (i.e., from external components), and generates tokens by performing a lexical analysis on the source code SC. The lexical analyzer 122 may check whether a lexical error exists in the source code SC when performing the lexical analysis on the source code SC.

The syntax analyzer 124 receives the tokens from the lexical analyzer 122, and generates a syntax structure by performing a syntax analysis and a parsing on the tokens. The syntax analyzer 124 may check whether a syntax error exists in the source code SC when performing the syntax analysis and the parsing on the tokens.

The semantic analyzer 126 receives the syntax structure from the syntax analyzer 124, and performs a semantic analysis on the syntax structure.

The intermediate code generator 128 generates the intermediate code IR from the source code SC based on the semantic analysis.

The code modification block 140 receives the intermediate code IR from the front-end block 120, and generates a modified-intermediate code CIR by modifying the intermediate code IR. The code modification block 140 may modify the intermediate code IR by replacing a first command that satisfies a predetermined condition, among commands included in the intermediate code IR, with a conditional branch command. Here, the predetermined condition may include a condition in which a result of the first command is handled (or, treated) as a constant in the intermediate code IR, a condition in which the result of the first command and a result of a second command that is different from the first command are concurrently used in a third command that is different from the first command and the second command in the intermediate code IR, and a condition in which a result of the third command is determined by the constant regardless of the result of the second command in the intermediate code IR. In other words, the code modification block 140 may generate the modified-intermediate code CIR by replacing the first command with the conditional branch command when the first command that can be handled as the constant under a specific condition exists in the intermediate code IR, the result of the first command and the result of the second command are concurrently used in the third command in the intermediate code IR, and the result of the third command is determined by the constant regardless of the result of the second command in the intermediate code IR.

The predetermined condition may further include a condition in which the result of the second command and an intermediate result of the second command are not used in commands other than the third command in the intermediate code IR (i.e., a condition in which the result of the second command and the intermediate result of the second command do not affect the commands other than the third command in the intermediate code IR). Thus, the code modification block 140 may generate the modified-intermediate code OR by replacing the first command with the conditional branch command when the result of the second command and the intermediate result of the second command are not used in the commands other than the third command in the intermediate code IR. In this case, the code modification block 140 may eliminate (or, remove) the second command from a first branch part of the conditional branch command or a second branch part of the conditional branch command (i.e., may remove other commands having dependency) when replacing the first command with the conditional branch command, where the second branch part is opposite to the first branch part in the conditional branch command.

The back-end block 160 converts the modified-intermediate code CIR into the object code TC. That is, the back-end block 160 receives the modified-intermediate code CIR from the code modification block 140, and generates the object code TC based on the modified-intermediate code CIR.

For this operation, as illustrated in FIG. 3, the back-end block 160 includes an optimizer 162 and an object code generator 164. The optimizer 162 generates an optimized modified-intermediate code by optimizing the modified-intermediate code CIR received from the code modification block 140. That is, the optimizer 162 may shorten an execution time of the object code TC, and may reduce a memory space occupation of the object code TC by improving an inefficient part of the modified-intermediate code CIR.

The object code generator 164 generates the object code TC based on the optimized modified-intermediate code received from the optimizer 162. Subsequently, an execution file generator (e.g., a linker, an assembler, etc.) may generate an execution file, which can be executed in a hardware system, based on the object code TC output from the compiler 100.

In an example, as illustrated in FIG. 1, the code modification block 140 is located outside the front-end block 120 and the back-end block 160. In this case, the code modification block 140 is coupled between the intermediate code generator 128 of the front-end block 120 and the optimizer 162 of the back-end block 160. In another example, the code modification block 140 may be located inside the front-end block 120. In this case, the code modification block 140 may be combined with the intermediate code generator 128 of the front-end block 120. Thus, the code modification block 140 may interact with the intermediate code generator 128. The intermediate code generator 128 may further perform a function of the code modification block 140. In still another example, the code modification block 140 may be located inside the back-end block 160. In this case, the code modification block 140 may be combined with the optimizer 162 of the back-end block 160. Thus, the code modification block 140 may interact with the optimizer 162. The optimizer 162 may further perform a function of the code modification block 140.

As described above, the compiler 100 may prevent an execution time from being unnecessarily increased when the object code TC generated from the source code SC is executed in a specific hardware by replacing the command that satisfies the predetermined condition, among the commands included in the intermediate code IR generated from the source code SC, with the conditional branch command when a compiling by which the source code SC is converted into the object code TC is performed. For example, the command that satisfies the predetermined condition, among the commands included in the intermediate code IR (e.g., the first command that can be handled as the constant under a specific condition in the intermediate code IR), may include 'step', 'smoothstep', 'max', 'min', 'clamp', 'sign', etc. among OpenGL Shader commands in a graphics field. However, the first command that satisfies the predetermined condition, among the commands included in the intermediate code IR, is not limited thereto.

Because the conditional branch command (e.g., if-then, etc.) occasionally results in a cache miss, the conditional branch command has been recognized as an improper command in compilers. As performance of the hardware system is enhanced, the conditional branch command may be no longer a burden to the hardware system that is capable of concurrently performing many threads. Thus, the compiler 100 may shorten (or, reduce) execution times of other commands related to the command that satisfies the predetermined condition by intentionally reinterpreting the command that satisfies the predetermined condition as the conditional branch command. If an execution time of the command that satisfies the predetermined condition is equal to an execution time of the conditional branch command, an effect (i.e., a performance improvement of the compiler 100) may be greatly increased.

Figure 4:
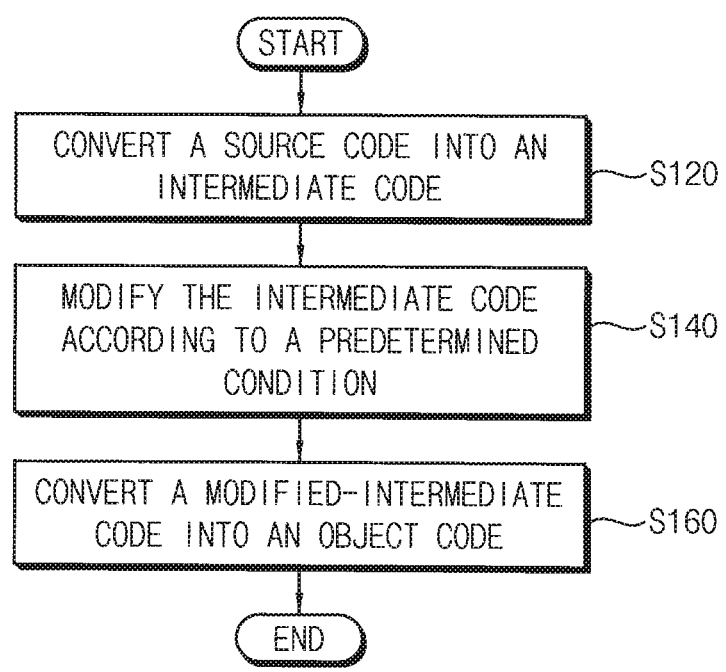
FIG. 4 is a flowchart illustrating a process in which a source code is converted into an object code by the compiler of FIG. 1.

FIG. 4 is a flowchart illustrating a process in which a source code is converted into an object code by the compiler of FIG. 1. FIGS. 5A and 5B are diagrams illustrating an example in which an intermediate code is modified into a modified-intermediate code by the compiler of FIG. 1. FIGS. 6A and 6B are diagrams illustrating another example in which an intermediate code is modified into a modified-intermediate code by the compiler of FIG. 1.

Referring to FIGS. 4 through 6B, the compiler 100 converts the source code SC into the intermediate code IR (S120), modifies the intermediate code IR to the modified-intermediate code CIR according to a predetermined condition (S140), and converts the modified-intermediate code CIR into the object code TC (S160).

Here, the compiler 100 may generate the modified-intermediate code CIR from the intermediate code IR by replacing the first command that satisfies the predetermined condition, among the commands included in the intermediate code IR, with the conditional branch command. In examples, the compiler 100 may generate the modified-intermediate code CIR by replacing the first command with the conditional branch command when the first command that can be handled as a constant under a specific condition exists in the intermediate code IR, a result of the first command and a result of the second command are used in the third command, and a result of the third command is determined by the constant regardless of the result of the second command. In another example, the compiler 100 may generate the modified-intermediate code CIR by replacing the first command with the conditional branch command when the result of the second command and an intermediate result of the second command are not used in commands other than the third command in the intermediate code IR. In this case, the compiler 100 may eliminate the second command from a first branch part of the conditional branch command or a second branch part of the conditional branch command when replacing the first command with the conditional branch command, where the second branch part is opposite to the first branch part in the conditional branch command.

Hereinafter, various examples in which the intermediate code IR is modified (or, changed) to the modified-intermediate code CIR will be described with reference to FIGS. 5A through 6B. For convenience of description, it is illustrated in FIGS. 5A through 6B that the first command is replaced with the conditional branch command in the source code SC instead of the intermediate code IR.

As illustrated in FIGS. 5A and 5B, the intermediate code BCD(1) and the intermediate code BCD(2) are modified (or, changed) to the modified-intermediate code ACD(1) by the compiler 100. As for the intermediate code BCD(1), the first command (i.e., step(b,c)) that can be handled as a constant under a specific condition exists, the second command (i.e., vec4 d=evaluate_function( )) and the third command (i.e., vec4 color=step(b,c)*d) exist, and the result of the second command (i.e., vec4 d=evaluate_function( )) and the result of the first command (i.e., step(b,c)) are used in the third command (i.e., vec4 color=step(b,c)*d). Here, the first command (i.e., step(b,c)) is handled as the constant (i.e., 0) when the constant (i.e., b) is smaller than or equal to the constant (i.e., c). In addition, the first command (i.e., step(b,c)) is handled as the constant (i.e., 1) when the constant (i.e., b) is greater than the constant (i.e., c). Thus, because the first command (i.e., step(b,c)) is handled as the constant (i.e., 0) when the constant (i.e., b) is smaller than or equal to the constant (i.e., c), the result of the third command (i.e., vec4 color=step(b,c)*d) is determined by the constant (i.e., 0) regardless of the result of the second command (i.e., vec4 d=evaluate_function( )). In other words, the result of the second command (i.e., vec4 d=evaluate_function( )) is ignored.

Similarly, as for the intermediate code BCD(2), the first command (i.e., float a=step(b,c)) that can be handled as a constant under a specific condition exists, the second command (i.e., vec4 d=evaluate_function( )) and the third command (i.e., color=a*d) exist, and the result of the second command (i.e., vec4 d=evaluate_function( )) and the result of the first command (i.e., float a=step(b,c)) are used in the third command (i.e., color=a*d). Here, the first command (i.e., float a=step(b,c)) is handled as the constant (i.e., 0) when the constant (i.e., b) is smaller than or equal to the constant (i.e., c). In addition, the first command (i.e., float a=step(b,c)) is handled as the constant (i.e., 1) when the constant (i.e., b) is greater than the constant (i.e., c). Thus, because the first command (i.e., float a=step(b,c)) is handled as the constant (i.e., 0) when the constant (i.e., b) is smaller than or equal to the constant (i.e., c), the result of the third command (i.e., color=a*d) is determined by the constant (i.e., 0) regardless of the result of the second command (i.e., vec4 d=evaluate_function( )). In other words, the result of the second command (i.e., vec4 d=evaluate_function( )) is ignored. The intermediate code BCD(1) is substantially the same as the intermediate code BCD(2) although the intermediate code BCD(1) and the intermediate code BCD(2) differ in expression.

Thus, the compiler 100 generates the modified-intermediate code ACD(1) by replacing (or, reinterpreting) the first command (i.e., step(b,c)) with the conditional branch command (i.e., if-else) in the intermediate code BCD(1). In addition, the compiler 100 generates the modified-intermediate code ACD(1) by replacing the first command (i.e., float a=step(b,c)) with the conditional branch command (i.e., if-else) in the intermediate code BCD(2). In detail, as for the modified-intermediate code ACD(1) modified from the intermediate code BCD(1), because the first command (i.e., step(b,c)) is handled as the constant (i.e., 0) when the constant (i.e., b) is smaller than or equal to the constant (i.e., c), the first branch part (i.e., if) of the conditional branch command (i.e., if-else) includes a command (i.e., color=vec4(0.0)). In addition, because the first command (i.e., step(b,c)) is handled as the constant (i.e., 1) when the constant (i.e., b) is greater than the constant (i.e., c), the second branch part (i.e., else) of the conditional branch command (i.e., if-else) includes the second command (i.e., vec4 d=evaluate_function( )) and a command (i.e., color=d). That is, the compiler 100 eliminates the second command (i.e., vec4 d=evaluate_function( )) from the first branch part (i.e., if) of the conditional branch command (i.e., if-else) when replacing the first command (i.e., step(b,c)) with the conditional branch command (i.e., if-else).

Similarly, as for the modified-intermediate code ACD(1) modified from the intermediate code BCD(2), because the first command (i.e., float a=step(b,c)) is handled as the constant (i.e., 0) when the constant (i.e., b) is smaller than or equal to the constant (i.e., c), the first branch part (i.e., if) of the conditional branch command (i.e., if-else) includes a command (i.e., color=vec4(0.0)). In addition, because the first command (i.e., float a=step(b,c)) is handled as the constant (i.e., 1) when the constant (i.e., b) is greater than the constant (i.e., c), the second branch part (i.e., else) of the conditional branch command (i.e., if-else) includes the second command (i.e., vec4 d=evaluate_function( )) and a command (i.e., color=d). That is, the compiler 100 eliminates the second command (i.e., vec4 d=evaluate_function( )) from the first branch part (i.e., if) of the conditional branch command (i.e., if-else) when replacing the first command (i.e., float a=step(b,c)) with the conditional branch command (i.e., if-else).

As illustrated in FIGS. 6A and 6B, the intermediate code BCD(3) and the intermediate code BCD(4) are modified (or, changed) to the modified-intermediate code ACD(2) by the compiler 100. As for the intermediate code BCD(3), the first command (i.e., max(b,0)) that can be handled as a constant under a specific condition exists, the second command (i.e., vec4 d=evaluate_function( )) and the third command (i.e., vec4 color=max(b,0)*d) exist, and the result of the second command (i.e., vec4 d=evaluate_function( )) and the result of the first command (i.e., max(b,0)) are used in the third command (i.e., vec4 color=max(b,0)*d). Here, the first command (i.e., max(b,0)) is handled as the constant (i.e., 0) when the constant (i.e., b) is smaller than or equal to the constant (i.e., 0). In addition, the first command (i.e., max(b,0)) is handled as the constant (i.e., b) when the constant (i.e., b) is greater than the constant (i.e., 0). Thus, because the first command (i.e., max(b,0)) is handled as the constant (i.e., 0) when the constant (i.e., b) is smaller than or equal to the constant (i.e., 0), the result of the third command (i.e., vec4 color=max(b,0)*d) is determined by the constant (i.e., 0) regardless of the result of the second command (i.e., vec4 d=evaluate_function( )). In other words, the result of the second command (i.e., vec4 d=evaluate_function( )) is ignored.

Similarly, as for the intermediate code BCD(4), the first command (i.e., float a=max(b,0)) that can be handled as a constant under a specific condition exists, the second command (i.e., vec4 d=evaluate_function( )) and the third command (i.e., color=a*d) exist, and the result of the second command (i.e., vec4 d=evaluate_function( )) and the result of the first command (i.e., float a=max(b,0)) are used in the third command (i.e., color=a*d). Here, the first command (i.e., float a=max(b,0)) is handled as the constant (i.e., 0) when the constant (i.e., b) is smaller than or equal to the constant (i.e., 0). In addition, the first command (i.e., float a=max(b,0)) is handled as the constant (i.e., b) when the constant (i.e., b) is greater than the constant (i.e., 0). Thus, because the first command (i.e., float a=max(b,0)) is handled as the constant (i.e., 0) when the constant (i.e., b) is smaller than or equal to the constant (i.e., 0), the result of the third command (i.e., color=a*d) is determined by the constant (i.e., 0) regardless of the result of the second command (i.e., vec4 d=evaluate_function( )). In other words, the result of the second command (i.e., vec4 d=evaluate_function( )) is ignored. The intermediate code BCD(3) is substantially the same as the intermediate code BCD(4) although the intermediate code BCD(3) and the intermediate code BCD(4) differ in expression.

Thus, the compiler 100 generates the modified-intermediate code ACD(2) by replacing (or, reinterpreting) the first command (i.e., max(b,0)) with the conditional branch command (i.e., if-else) in the intermediate code BCD(3). In addition, the compiler 100 generates the modified-intermediate code ACD(2) by replacing the first command (i.e., float a=max(b,0)) with the conditional branch command (i.e., if-else) in the intermediate code BCD(4). In detail, as for the modified-intermediate code ACD(2) modified from the intermediate code BCD(3), because the first command (i.e., max(b,0)) is handled as the constant (i.e., 0) when the constant (i.e., b) is smaller than or equal to the constant (i.e., 0), the first branch part (i.e., if) of the conditional branch command (i.e., if-else) includes a command (i.e., color=vec4(0.0)). In addition, because the first command (i.e., max(b,0)) is handled as the constant (i.e., b) when the constant (i.e., b) is greater than the constant (i.e., 0), the second branch part (i.e., else) of the conditional branch command (i.e., if-else) includes the second command (i.e., vec4 d=evaluate_function( )) and a command (i.e., color=b*d). That is, the compiler 100 eliminates the second command (i.e., vec4 d=evaluate_function( ) from the first branch part (i.e., if) of the conditional branch command (i.e., if-else) when replacing the first command (i.e., max(b,0)) with the conditional branch command (i.e., if-else).

Similarly, as for the modified-intermediate code ACD(2) modified from the intermediate code BCD(4), because the first command (i.e., float a=max(b,0)) is handled as the constant (i.e., 0) when the constant (i.e., b) is smaller than or equal to the constant (i.e., 0), the first branch part (i.e., if) of the conditional branch command (i.e., if-else) includes a command (i.e., color=vec4(0.0)). In addition, because the first command (i.e., float a=max(b,0)) is handled as the constant (i.e., b) when the constant (i.e., b) is greater than the constant (i.e., 0), the second branch part (i.e., else) of the conditional branch command (i.e., if-else) includes the second command (i.e., vec4 d=evaluate_function( )) and a command (i.e., color=b*d). That is, the compiler 100 eliminates the second command (i.e., vec4 d=evaluate_function( )) from the first branch part (i.e., if) of the conditional branch command (i.e., if-else) when replacing the first command (i.e., float a=max(b,0)) with the conditional branch command (i.e., if-else).

Figure 7:
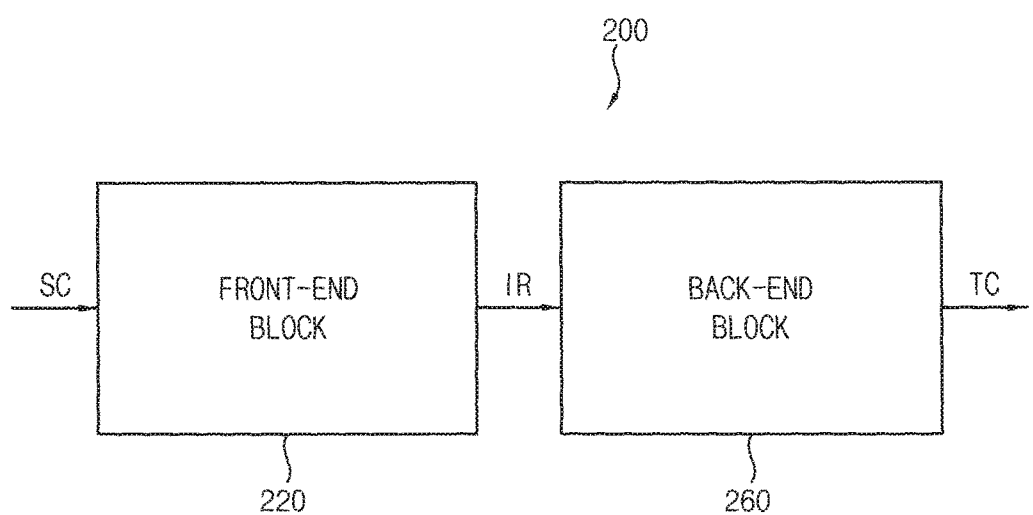
FIG. 7 is a block diagram illustrating a compiler according to another exemplary embodiment.
Figure 8:
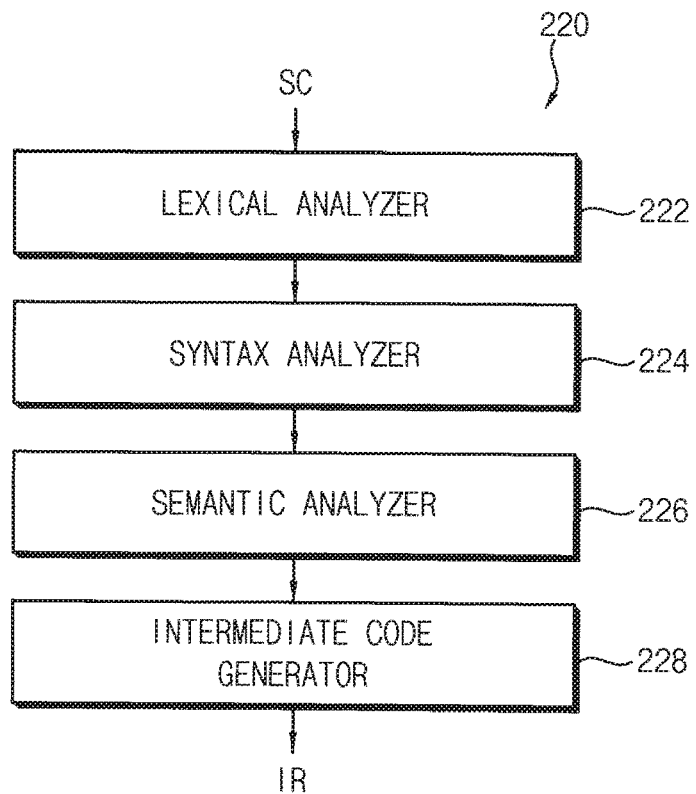
FIG. 8 is a block diagram illustrating an example of a front-end block included in the compiler of FIG. 7.
Figure 9:
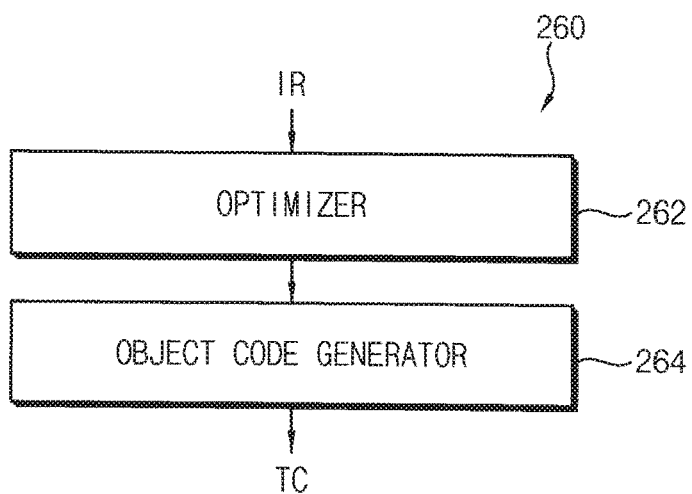
FIG. 9 is a block diagram illustrating an example of a back-end block included in the compiler of FIG. 7.

FIG. 7 is a block diagram illustrating a compiler 200 according to another exemplary embodiment. FIG. 8 is a block diagram illustrating an example of a front-end block 220 included in the compiler 200 of FIG. 7. FIG. 9 is a block diagram illustrating an example of a back-end block 260 included in the compiler 200 of FIG. 7.

Referring to FIGS. 7 through 9, the compiler 200 converts a source code SC (or, a source program) into an object code TC (or, an object program). For this operation, the compiler 200 includes the front-end block 220 and the back-end block 260.

The front-end block 220 converts the source code SC into an intermediate code IR. Here, the intermediate code IR may be an internal code for converting the source code SC into the object code TC. In an example, a format of the intermediate code IR may be the same as a format of the source code SC. In another example, the format of the intermediate code IR may be different from the format of the source code SC. The front-end block 220 may receive the source code SC that is programmed by a specific programming language, and generates the intermediate code IR, which is to be converted into the object code TC, based on the source code SC.

Here, the front-end block 220 may generate the intermediate code IR by replacing a first command that satisfies a predetermined condition, among commands included in the source code SC, with a conditional branch command. Here, the predetermined condition may include a condition in which a result of the first command is handled (or, treated) as a constant in the source code SC, a condition in which a result of the first command and a result of a second command that is different from the first command are concurrently used in a third command that is different from the first command and the second command in the source code SC, and a condition in which a result of the third command is determined by the constant regardless of the result of the second command in the source code SC. In other words, the front-end block 220 may generate the intermediate code IR by replacing the first command with the conditional branch command when the first command that can be handled as the constant under a specific condition exists in the source code SC, the result of the first command and the result of the second command are concurrently used in the third command in the source code SC, and the result of the third command is determined by the constant regardless of the result of the second command in the source code SC.

For this operation, as illustrated in FIG. 8, the front-end block 220 includes a lexical analyzer 222, a syntax analyzer 224, a semantic analyzer 226, and an intermediate code generator 228. The lexical analyzer 222 receives the source code SC from outside (i.e., from external components), and generates tokens by performing a lexical analysis on the source code SC. The lexical analyzer 222 may check whether a lexical error exists in the source code SC when performing the lexical analysis on the source code SC.

The syntax analyzer 224 receives the tokens from the lexical analyzer 222, and generates a syntax structure by performing a syntax analysis and a parsing on the tokens. The syntax analyzer 224 may check whether a syntax error exists in the source code SC when performing the syntax analysis and the parsing on the tokens.

The semantic analyzer 226 receives the syntax structure from the syntax analyzer 224, and performs a semantic analysis on the syntax structure.

The intermediate code generator 228 generates the intermediate code IR from the source code SC based on the semantic analysis. Here, the intermediate code generator 228 may replace the first command that satisfies the predetermined condition with the conditional branch command when generating the intermediate code IR.

As described above, the predetermined condition may include the condition in which the result of the first command is handled as the constant in the source code SC, the condition in which the result of the first command and the result of the second command are concurrently used in the third command in the source code SC, and the condition in which the result of the third command is determined by the constant regardless of the result of the second command in the source code SC. The predetermined condition may further include a condition in which the result of the second command and an intermediate result of the second command are not used in commands other than the third command in the source code SC (i.e., a condition in which the result of the second command and the intermediate result of the second command do not affect the commands other than the third command in the source code SC). That is, the front-end block 220 (i.e., the intermediate code generator 228) may generate the intermediate code IR by replacing the first command with the conditional branch command when the result of the second command and the intermediate result of the second command are not used in the commands other than the third command in the source code SC. In this case, the front-end block 220 may eliminate the second command from a first branch part of the conditional branch command or a second branch part of the conditional branch command (i.e., may remove other commands having dependency) when replacing the first command with the conditional branch command, where the second branch part is opposite to the first branch part in the conditional branch command.

The back-end block 260 converts the intermediate code IR into the object code TC. That is, the back-end block 260 receives the intermediate code IR from the front-end block 220, and generates the object code TC based on the intermediate code IR.

For this operation, as illustrated in FIG. 9, the back-end block 260 includes an optimizer 262 and an object code generator 264. The optimizer 262 generates an optimized intermediate code by optimizing the intermediate code IR received from the front-end block 220. That is, the optimizer 262 may shorten an execution time of the object code TC, and may reduce a memory space occupation of the object code TC by improving an inefficient part of the intermediate code IR.

The object code generator 264 generates the object code TC based on the optimized intermediate code received from the optimizer 262. Subsequently, an execution file generator (e.g., a linker, an assembler, etc.) may generate an execution file, which can be executed in a hardware system, based on the object code TC output from the compiler 200.

As described above, the compiler 200 may prevent an execution time from being unnecessarily increased when the object code TC generated from the source code SC is executed in a specific hardware by replacing the command that satisfies the predetermined condition, among the commands included in the source code SC, with the conditional branch command when a compiling by which the source code SC is converted into the object code TC is performed. For example, the command that satisfies the predetermined condition, among the commands included in the source code SC (e.g., the first command that can be handled as the constant under a specific condition in the source code SC), may include 'step', 'smoothstep', 'max', 'min', 'clamp', 'sign', etc. among OpenGL Shader commands in a graphics field. However, the first command that satisfies the predetermined condition, among the commands included in the source code SC, is not limited thereto.

Figure 10:
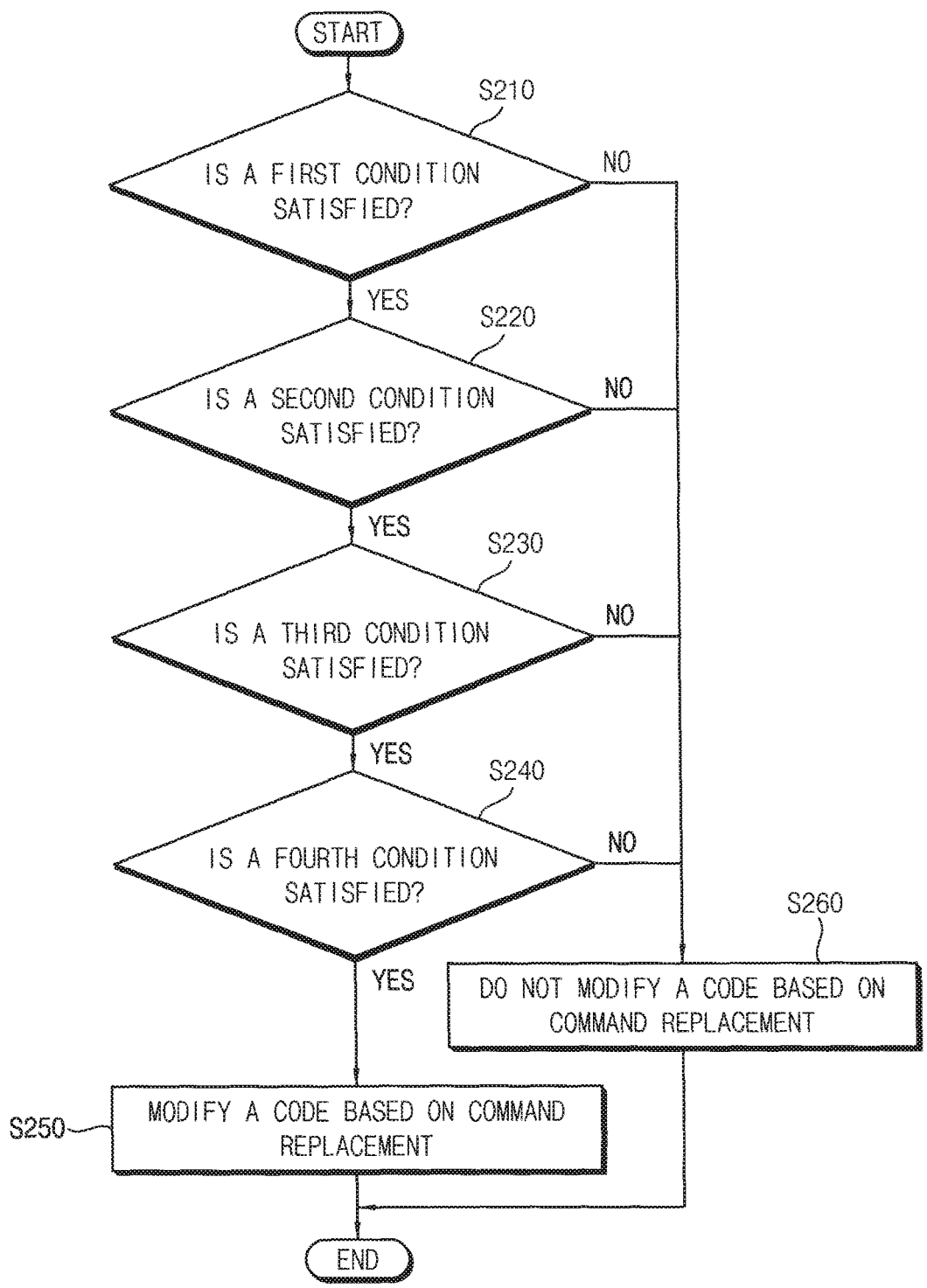
FIG. 10 is a flowchart illustrating a method of compiling a source code according to an exemplary embodiment.
Figure 11A:
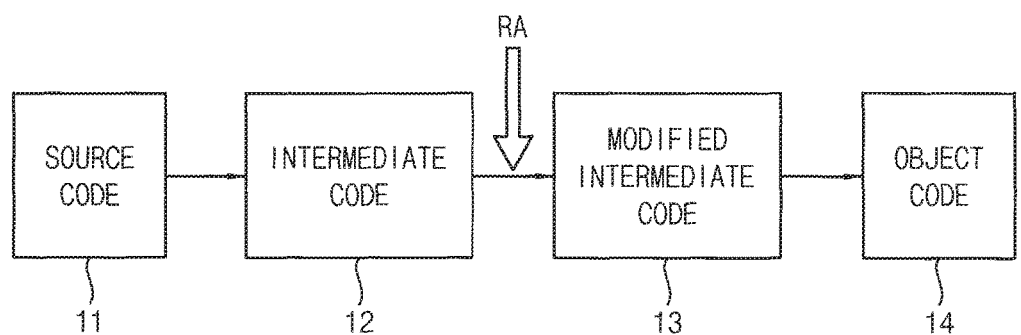
FIG. 11A is a diagram illustrating an example in which a source code is converted into an object code by the method of FIG. 10.
Figure 11B:
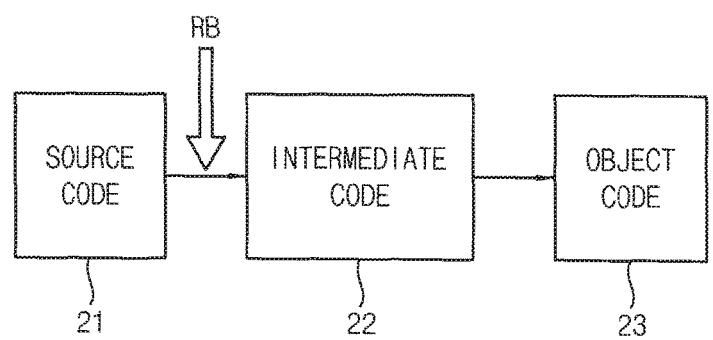
FIG. 11B is a diagram illustrating another example in which a source code is converted into an object code by the method of FIG. 10.

FIG. 10 is a flowchart illustrating a method of compiling a source code according to an exemplary embodiment. FIG. 11A is a diagram illustrating an example in which a source code is converted into an object code by the method of FIG. 10. FIG. 11B is a diagram illustrating another example in which a source code is converted into an object code by the method of FIG. 10.

Referring to FIGS. 10 through 11B, the method of FIG. 10 may search a first command of which a result can be handled as a constant among commands included in an input code, may search a third command of which a result is determined by the constant regardless of a result of a second command, where the third command concurrently uses the result of the first command and the result of the second command, and may generate an output code by replacing the first command used in the third command with a conditional branch command. In another example, the method of FIG. 10 may replace the first command with the conditional branch command when the result of the second command and an intermediate result of the second command are not used in commands other than the third command. In this example, the method of FIG. 10 may eliminate the second command from a first branch part of the conditional branch command or a second branch part of the conditional branch command, where the second branch part is opposite to the first branch part in the conditional branch command.

In an example, as illustrated in FIG. 11A, the input code is an intermediate code 12 generated (or, converted) from a source code 11, and the output code is a modified-intermediate code 13 to be converted into an object code 14. That is, the method of FIG. 10 generates the modified-intermediate code 13 (i.e., indicated as RA) by replacing the first command with the conditional branch command in the intermediate code 12. In this case, the method of FIG. 10 may be applied to the compiler 100 of FIG. 1 including the front-end block 120, the code modification block 140, and the back-end block 160.

In another example, as illustrated in FIG. 11B, the input code is a source code 21, and the output code is an intermediate code 22 to be converted into an object code 23. That is, the method of FIG. 10 generates the intermediate code 22 (i.e., indicated as RB) by replacing the first command with the conditional branch command in the source code 21. In this case, the method of FIG. 10 may be applied to the compiler 200 of FIG. 7 including the front-end block 220 and the back-end block 260. Hereinafter, the method of FIG. 10 will be described in detail with reference to FIGS. 10 through 11B.

The method of FIG. 10 checks whether the first command that can be handled as the constant under a specific condition exists in the input code (S210). That is, the method of FIG. 10 checks whether a first condition is satisfied. Here, when the first command that can be handled as the constant under a specific condition does not exist in the input code, the method of FIG. 10 does not modify the input code based on command replacement (S260) to generate the output code.

On the other hand, when the first command that can be handled as the constant under a specific condition exists in the input code, the method of FIG. 10 checks whether the result of the first command and the result of the second command (i.e., a command that is different from the first command in the input code) are used in the third command (i.e., a command that is different from the first command and the second command in the input code) (S220). That is, the method of FIG. 10 checks whether a second condition is satisfied. Here, when the result of the first command and the result of the second command are not used in the third command, the method of FIG. 10 does not modify the input code based on command replacement (S260) (i.e., maintains the first command) to generate the output code.

On the other hand, when the result of the first command and the result of the second command are used in the third command, the method of FIG. 10 checks whether the result of the third command is determined by the constant (S230). That is, the method of FIG. 10 checks whether a third condition is satisfied. Here, when the result of the third command is not determined by the constant, the method of FIG. 10 does not modify the input code based on command replacement (S260) (i.e., maintains the first command) to generate the output code.

On the other hand, when the result of the third command is determined by the constant, the method of FIG. 10 checks whether the result of the second command and the intermediate result of the second command are not used in the commands other than the third command (S240). That is, the method of FIG. 10 checks whether a fourth condition is satisfied. Here, when the result of the second command and the intermediate result of the second command are used in the commands other than the third command, the method of FIG. 10 does not modify the input code based on command replacement (S260) (i.e., maintains the first command) to generate the output code.

On the other hand, when the result of the second command and the intermediate result of the second command are not used in the commands other than the third command, the method of FIG. 10 modifies the input code by replacing the first command with the conditional branch command (S250) to generate the output code.

Figure 12:
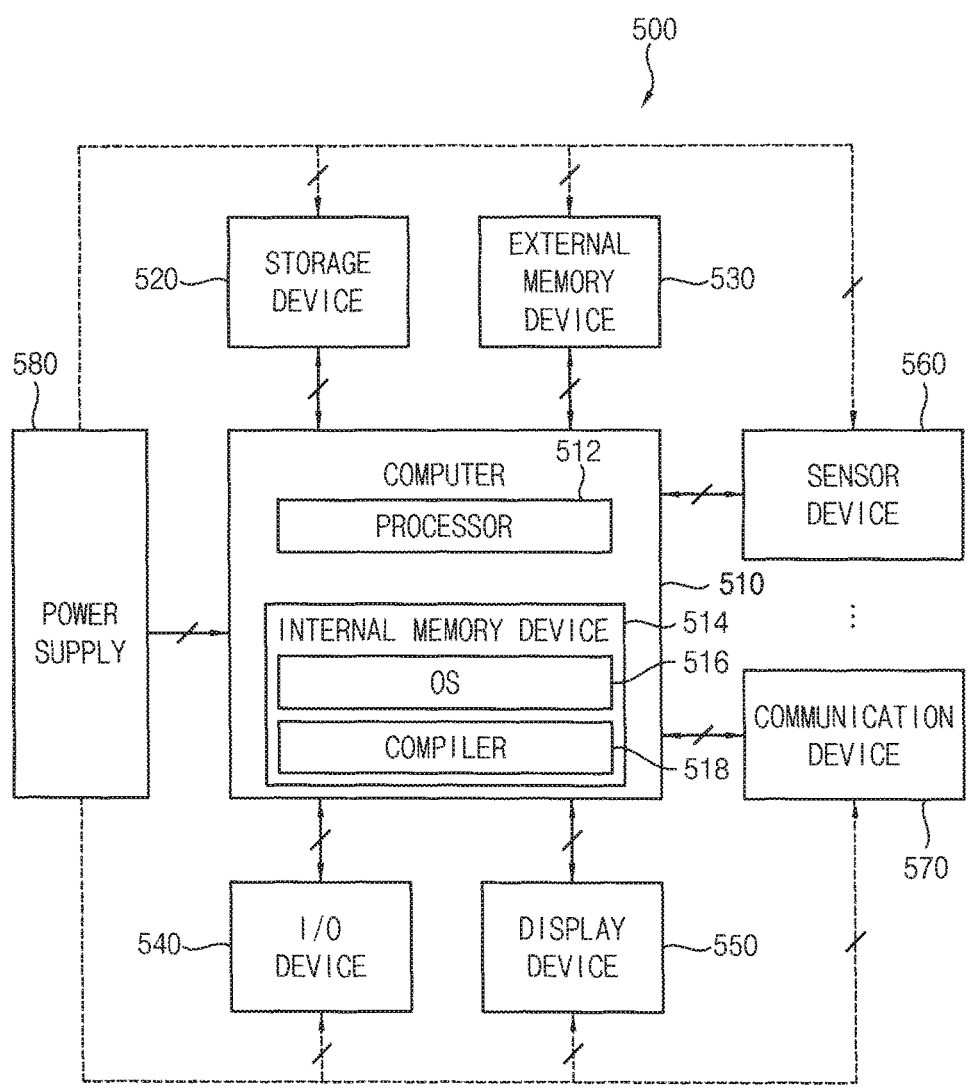
FIG. 12 is a block diagram illustrating a hardware system according to an exemplary embodiment.

FIG. 12 is a block diagram illustrating a hardware system according to an exemplary embodiment.

Referring to FIG. 12, the hardware system 500 includes a computer 510, a storage device 520, an external memory device 530, an input/output (I/O) device 540, a display device 550, a sensor device 560, a communication device 570, and a power supply 580. Here, the hardware system 500 may be implemented as a personal computer (PC), a workstation, a laptop, a digital camera, a cellular phone, a smart phone, a video phone, a smart pad, a tablet PC, a personal digital assistant (PDA), a portable multimedia player (PMP), etc. However, the hardware system 500 is not limited thereto.

The computer 510 includes a processor 512 and an internal memory device 514. An operating system (OS) 516 and a compiler 518 are included in the internal memory device 514. The processor 512 may perform various computing functions. The processor 512 may be a micro processor, a central processing unit, an application processor, etc. The processor 512 may be coupled to other components via an address bus, a control bus, a data bus, etc. Further, the processor 512 may be coupled to an extended bus such as a peripheral component interconnection (PCI) bus.

The internal memory device 514 may store data for operations of the computer 510. The internal memory device 514 may store a source code that is to be converted into an object code by the compiler 518, the object code that is generated from the source code by the compiler 518, an execution file that is generated based on the object code by a linker, an assembler, etc. The storage device 520 may be a solid state drive (SSD) device, a hard disk drive (HDD) device, a CD-ROM device, etc. The external memory device 530 may store data for operations of the hardware system 500. For example, the internal memory device 514 and the external memory device 530 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The I/O device 540 may include an input device such as a keyboard, a keypad, a mouse device, a touchpad, a touch-screen, etc. and an output device such as a printer, a speaker, etc. The display device 550 may display an image to provide visual information to a user. The sensor device 560 may include a gyro sensor module that measures a rotating angular speed, an acceleration sensor module that measures a speed and a momentum, a geomagnetic field sensor module that acts as a compass, a barometer sensor module that measures an altitude, a gesture-proximity-illumination sensor module that performs various operations such as a motion recognition, a proximity detection, an illumination measurement, etc., a temperature-humidity sensor module that measures a temperature and a humidity, and a grip sensor module that determines whether the hardware system 500 is gripped by a user.

The communication device 570 may perform a communication function of the hardware system 500. For example, the communication system 570 may include a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, etc. The power supply 580 may provide power for operations of the hardware system 500.

Although various components included in the hardware system 500 are mentioned above, components included in the hardware system 500 are not limited thereto. For example, the hardware system 500 may further include a global positioning system (GPS) module, etc.

When the compiler 518 performs a compiling to convert a source code into an object code, the compiler may replace (or, reinterpret) a command that satisfies a predetermined condition, among commands included in a source code or an intermediate code generated from the source code, with a conditional branch command. Thus, the complier 518 included in the computer 510 may prevent an execution time from being unnecessarily increased when the object code is executed in the hardware system 500.

In an example, the compiler 518 may include a front-end block that converts the source code into an intermediate code, a code modification block that generates the modified-intermediate code from the intermediate code by replacing a first command that satisfies a predetermined condition, among the commands included in the intermediate code, with the conditional branch command, and a back-end block that converts the modified-intermediate code into the object code. In another example, the compiler 518 may include a front-end block that replaces a first command that satisfies a predetermined condition, among the commands included in the source code, with the conditional branch command, to generate the intermediate code (i.e., converts the source code into the intermediate code), and a back-end block that converts the intermediate code into the object code. Here, the predetermined condition may include a condition in which a result of the first command is handled as a constant in the source code or the intermediate code, a condition in which a result of the first command and a result of a second command that is different from the first command are concurrently used in a third command that is different from the first command and the second command in the source code or the intermediate code, and a condition in which a result of the third command is determined by the constant regardless of the result of the second command in the source code or the intermediate code. The predetermined condition may further include a condition in which the result of the second command and an intermediate result of the second command are not used in commands other than the third command in the source code or the intermediate code. Because the compiler 518 is described above, duplicated description will not be repeated.

The present inventive concept may be applied to a compiler and a hardware system including the compiler. For example, the present inventive concept may be applied to a personal computer, a workstation, a laptop, a digital camera, a cellular phone, a smart phone, a video phone, a smart pad, a tablet PC, a personal digital assistant, a portable multimedia player, etc.

In addition, the present inventive concept may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A computer system for compiling a source code into an object code, the computer system comprising:
   a memory storing instructions; and
   a processor configured to execute the instructions to implement:
     a first converter configured to convert the source code into an intermediate code;
     a first generator configured to generate a modified-intermediate code by replacing a first command among commands included in the intermediate code, with a conditional branch command, in response to the intermediate code satisfying:
       a first condition in which a first result of the first command is handled as a constant;
       a second condition in which the first result of the first command and a second result of a second command among the commands are concurrently used in a third command among the commands;
       a third condition in which a third result of the third command is determined by the constant regardless of the second result of the second command; and
       a fourth condition in which the second result of the second command and an intermediate result of the second command are not used in the commands other than the third command in the intermediate code; and
     a second converter configured to convert the modified-intermediate code into the object code,
     wherein the first command does not exist in the modified-intermediate code after the first command is replaced with the conditional branch command.

2. The computer system of claim 1, wherein the first generator is further configured to generate the modified-intermediate code by removing the second command from a first branch part of the conditional branch command or a second branch part of the conditional branch command as the first command is replaced with the conditional branch command, the first branch part being opposite to the second branch part.

3. The computer system of claim 1, wherein the first converter comprises:
   a lexical analyzer configured to generate tokens by performing a lexical analysis on the source code;
   a syntax analyzer configured to generate a syntax structure by performing a syntax analysis and a parsing on the tokens;
   a semantic analyzer configured to perform a semantic analysis on the syntax structure; and
   an intermediate code generator configured to generate the intermediate code, based on the semantic analysis.

4. The computer system of claim 3, wherein the second converter comprises:
   an optimizer configured to optimize the modified-intermediate code; and
   an object code generator configured to generate the object code, based on the modified-intermediate code that is optimized.

5. The computer system of claim 4, wherein the first generator is located outside the first converter and the second converter, and
   the first generator is coupled between the intermediate code generator included in the first converter and the optimizer included in the second converter.

6. The computer system of claim 4, wherein the first generator is located inside the first converter, and
   the first generator is combined with the intermediate code generator included in the first converter.

7. The computer system of claim 4, wherein the first generator is located inside the second converter, and
   the first generator is combined with the optimizer included in the second converter.

8. A computer system for compiling a source code into an object code, the computer system comprising:
   a memory storing instructions; and
   a processor configured to execute the instructions to implement:
     a first generator configured to generate an intermediate code by replacing a first command among commands included in the source code, with a conditional branch command, in response to the source code satisfying:
       a first condition in which a first result of the first command is handled as a constant;
       a second condition in which the first result of the first command and a second result of a second command among the commands are concurrently used in a third command among the commands;
       a third condition in which a third result of the third command is determined by the constant regardless of the second result of the second command; and
       a fourth condition in which the second result of the second command and an intermediate result of the second command are not used in the commands other than the third command in the intermediate code; and a first converter configured to convert the intermediate code into the object code, wherein the first command does not exist in the intermediate code after the first command is replaced with the condition branch command.

9. The computer system of claim 8, wherein the first generator is further configured to generate the intermediate code by removing the second command from a first branch part of the conditional branch command or a second branch part of the conditional branch command as the first command is replaced with the conditional branch command, the first branch part being opposite to the second branch part.

10. The computer system of claim 8, wherein the first generator comprises:

a lexical analyzer configured to generate tokens by performing a lexical analysis on the source code;

a syntax analyzer configured to generate a syntax structure by performing a syntax analysis and a parsing on the tokens;

a semantic analyzer configured to perform a semantic analysis on the syntax structure; and an intermediate code generator configured to generate the intermediate code, based on the semantic analysis and by replacing the first command with the conditional branch command, in response to the source code satisfying the first condition, the second condition, the third condition, and the fourth condition.

11. The computer system of claim 10, wherein the first converter comprises:

an optimizer configured to optimize the intermediate code; and an object code generator configured to generate the object code, based on the intermediate code that is optimized.

12. A computer implemented method for compiling a source code into an object code, the computer implemented method comprising:

converting the source code into an intermediate code;

determining whether a first condition is satisfied, the first condition being one in which a first result of a first command, among commands of the intermediate code, is handled as a constant;

determining whether a second condition is satisfied, the second condition being one in which the first result of the first command and a second result of a second command among the commands are concurrently used in a third command among the commands; and determining whether a third condition is satisfied, the third condition being one in which a third result of the third command is determined by the constant regardless of the second result of the second command;

determining whether a fourth condition is satisfied, the fourth condition being one in which the second result of the second command and an intermediate result of the second command are not used in the commands other than the third command in the intermediate code;

modifying the intermediate code by replacing the first command with a conditional branch command, in response to the first condition, the second condition, the third condition, and the fourth condition being determined to be satisfied; and converting the intermediate code that is modified into the object code, wherein the first command does not exist in the intermediate code that is modified after the first command is replaced with the conditional branch command.

13. The computer implemented method of claim 12, wherein the modifying includes modifying the intermediate code by removing the second command from a first branch part of the conditional branch command or a second branch part of the conditional branch command in response to the first command being replaced with the conditional branch command, the first branch part being opposite to the second branch part.

14. A non-transitory computer-readable storage medium storing a program including instructions to cause a computer to perform the computer implemented method of claim 12.

* * * * *